United States Patent [19]

Davis et al.

[11] 4,210,118
[45] Jul. 1, 1980

[54] COLLAPSIBLE BARBECUES

[75] Inventors: Frederick C. Davis; Richard L. Beer, both of Box Hill, Australia

[73] Assignee: Companion Pty. Limited, Box Hill, Australia

[21] Appl. No.: 928,892

[22] Filed: Jul. 28, 1978

[30] Foreign Application Priority Data

Jul. 29, 1977 [AU] Australia .............................. 1044/77

[51] Int. Cl.² ............................................. H47I 37/00
[52] U.S. Cl. .................................. 126/25 R; 126/9 R; 126/9 B
[58] Field of Search .............. 126/25, 25 A, 9 R, 227, 126/230, 236

[56] References Cited

U.S. PATENT DOCUMENTS

| 3,481,320 | 12/1969 | Schaefer | 126/25 R |
| 3,692,013 | 9/1972 | Grafton et al. | 126/25 R |
| 3,747,530 | 7/1973 | Santeramo | 126/25 R |

Primary Examiner—Samuel Scott
Assistant Examiner—Wesley S. Ratliff, Jr.
Attorney, Agent, or Firm—Schuyler, Birch, McKie & Beckett

[57] ABSTRACT

There is disclosed a portable barbecue cooking stove having scissor action support legs pivotally joined together and pivotably joined to a cooking and support surface by pivot pins and an over-center link arrangement so that in the erected position the cooking and support surface is in a horizontal position and is easily foldable by unlatching of a catch disconnecting the four bar linkage structure. The barbecue includes wheels for mobility.

3 Claims, 2 Drawing Figures

COLLAPSIBLE BARBECUES

BACKGROUND OF INVENTION

This invention relates to collapsible barbecues particularly collapsible portable barbecues.

One of the major problems with portable barbecues is achieving easy assembly and dis-assembly in use. In particular easy folding of such appliances after cooking is especially desirable.

The present invention has as its objective the provision of a portable barbecue which is easily folded with a minimum of dismantling of the structure.

SUMMARY OF INVENTION

There is provided according to one aspect of the present invention a cooking appliance comprising means for cooking food thereon, conveniently a hotplate, pivotable legs supporting the cooking means, said legs forming a four bar linkage with, and pivotably connected relative to said cooking means, the arrangement being such that the legs are movable between a folded and unfolded position said legs being conveniently held in unfolded position by releasable latching means.

There is provided according to a further aspect of the present invention a portable barbecue cooking appliance comprising a cooking surface for cooking food thereon, a support frame for said cooking surface including pivotable support legs supporting the cooking surface, said legs forming a four bar linkage pivotally connected to said support frame, the arrangement being such that the legs are movable between a folded and unfolded position, said legs being held in said unfolded position by releasable latching means.

There is provided according to a further aspect of the present invention a portable cooking appliance comprising means for cooking food thereon including a metal grill and support frame for said grill, pivotable legs supporting the frame, said legs being pivotally joined together to move with a scissor like action, the legs being pivotably connected to said support frame and a link to form a four bar linkage, the arrangement being such that the legs are movable between a folded and unfolded position, said legs being held in unfolded position by releasable latching means.

Conveniently the hotplate is supported on a perimetric frame to which said legs are pivotably connected. The four bar linkage includes a pair of members in criss cross formation pivotably connected together.

One pivotal connector to the hotplate support is connected by a link between the legs and the support. Thus an uneven four bar linkage is formed which creates an over-centre action during movement of the linkage. A spring is optionally provided to accentuate this action.

The invention will be described having greater detail with reference to the accompanying drawings.

DESCRIPTION OF PREFERRED EMBODIMENTS

Figure 1:
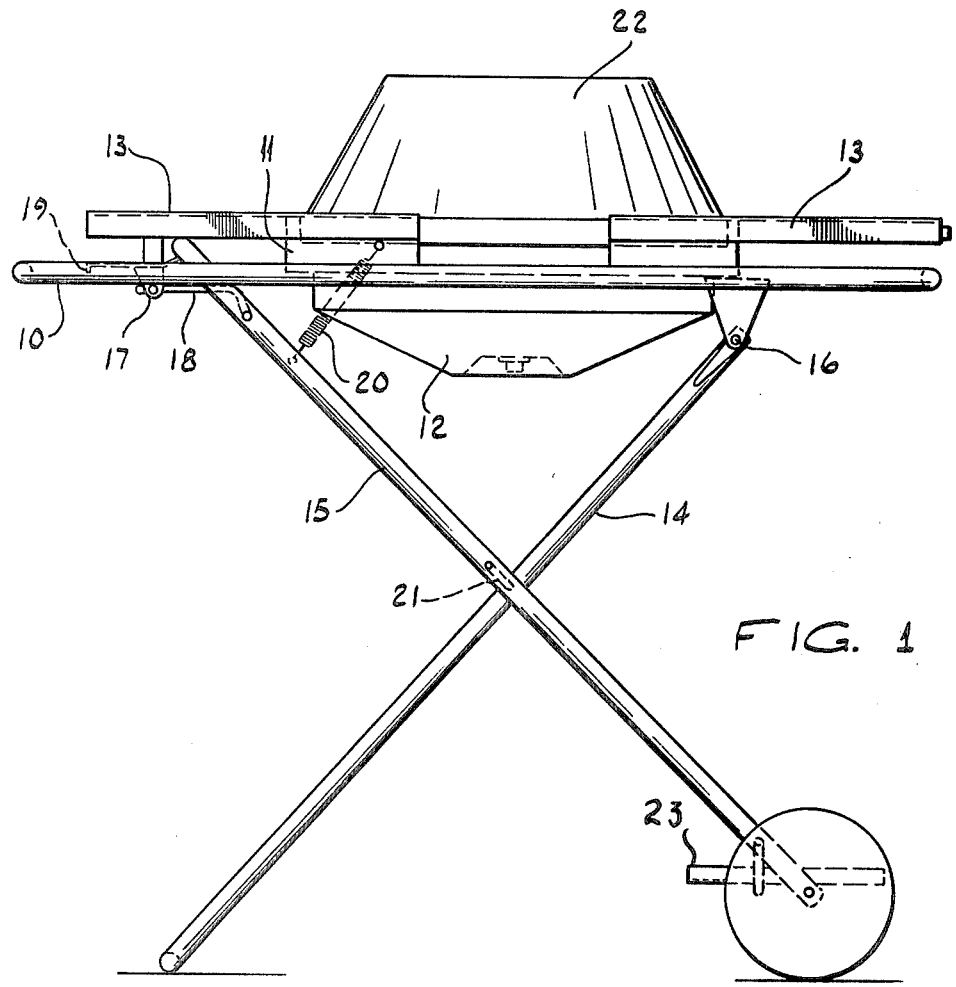
FIG. 1 is a side view of the barbecue in unfolded condition.
Figure 2:
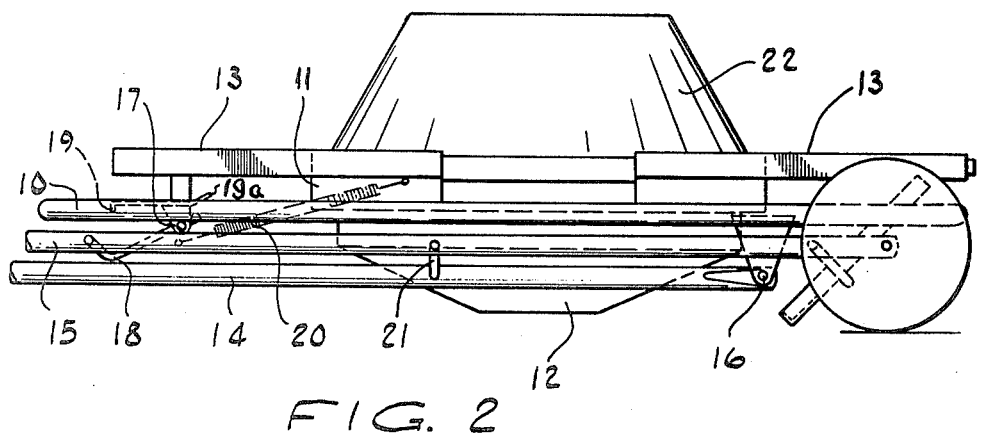
FIG. 2 is a side view of the barbecue in folded condition.

The barbecue includes a perimetric frame 10 upon which is mounted a central hotplate 11 and burner bowl 12 together with side trays 13. The frame 10 is mounted on crossed legs 14,15. Other forms of cooking surfaces other than a hotplate are envisaged. For example, an open flame surface such as an open grid over the burner may be provided.

The legs are preferably of round shape pivotally connected to the frame at points 16 and 17. The connector 17 is through a short over-centring link 18. The cross member part of leg 15 co-operates with a catch 19a of latch member 19. Spring 20 maintains the leg 15 latched with the latching member and accentuates the over-centring effect of the link 18.

The legs are pivotally connected by off-centre link 21 which allows close collapsing of the legs in the folded condition.

The side trays 13 provide a wind shield for the cooking surface 11 by being raised a short distance above the level of the surface.

An air gap is provided between the hotplate edge and the side trays to allow circulation of cool air and thus prevent overheating of the trays during operation of the barbecue.

The barbecue is best suited for using a gas burner for heating the hotplate. In an open grid cooking surface the gas burner may be used in conjunction with rock or artificial cinders such as scoria, not shown. In this arrangement cooking juices will fall onto the hot cinders, catch fire and thereby impart added flavour to the cooked food.

A hood 22 for the hotplate may also be provided.

Wheels mounted on the frame members for mobility are provided.

A bottle tray 23 to support a gas container may also be provided.

We claim:

1. A portable cooking appliance comprising means for cooking food thereon including a metal grill and support frame for said grill, pivotable legs supporting the frame, said legs being pivotally joined together to move with a scissor like action, the legs being pivotably connected to said support frame and an over-centre link to form a four bar linkage, the arrangement being such that the legs are movable between a folded and unfolded position, said legs being held in unfolded position by releasable latching means.

2. A cooking appliance as claimed in claim 1 wherein said cooking surface is supported by a perimetric support frame, said support legs being pivotally connected thereto.

3. A cooking appliance as claimed in claim 1 wherein said legs each form a rectangular framework, one leg frame being pivotally connected by a pin means to the support frame and the other leg frame being pivotally connected by a link between the leg frame and the support frame to form an uneven four bar linkage creating an over-centre action during movement of the legs batween a folded and unfolded position.

* * * * *